US008688175B2

(12) United States Patent
Saitoh et al.

(10) Patent No.: US 8,688,175 B2
(45) Date of Patent: *Apr. 1, 2014

(54) HANDSFREE APPARATUS FOR USE IN VEHICLE

(71) Applicant: Denso Corporation, Kariya (JP)

(72) Inventors: Souichi Saitoh, Obu (JP); Hideaki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,240

(22) Filed: Jan. 11, 2013

(65) Prior Publication Data

US 2013/0122969 A1     May 16, 2013

Related U.S. Application Data

(63) Continuation of application No. 12/670,014, filed as application No. PCT/JP2008/003213 on Nov. 6, 2008, now Pat. No. 8,369,903.

(30) Foreign Application Priority Data

Nov. 8, 2007    (JP) .................................. 2007-290746

(51) Int. Cl.
*H04M 1/00*      (2006.01)

(52) U.S. Cl.
USPC ........ 455/569.2; 455/557; 455/344; 455/66.1

(58) Field of Classification Search
USPC ........ 455/569.1, 569.2, 550.1, 557, 344, 346, 455/3.06, 41.2, 66.1, 99, 100, 566; 340/7.52, 7.54, 426.16, 426.2
See application file for complete search history.

(56) References Cited

U.S. PATENT DOCUMENTS

2002/0032048 A1    3/2002   Kitao et al.
2003/0003892 A1    1/2003   Makinen
(Continued)

FOREIGN PATENT DOCUMENTS

EP            2093982        8/2009
JP            2002-193046     7/2002
(Continued)

OTHER PUBLICATIONS

Office Action dated Jul. 25, 2012 in corresponding Chinese Application No. 200880112726.7 with English translation thereof.

(Continued)

*Primary Examiner* — Dominic E Rego
(74) *Attorney, Agent, or Firm* — Harness, Dickey & Pierce, PLC

(57) ABSTRACT

At least one of outbound call history data, inbound call history data, and phone book data is transferred to a handsfree apparatus for use in a vehicle at a predetermined timing for the purpose of obtaining near realtime update of the inbound/outbound call history data from a cellular phone. By utilizing simultaneous connection of HFP and PBAP, the handsfree apparatus establishes a Bluetooth communication with the cellular phone through HFP first, and then establishes another communication through PBAP simultaneously, for receiving the inbound call history data and the outbound call history data stored before establishing the Bluetooth communication from the cellular phone. The handsfree apparatus can thus be capable of placing a call by using the outbound call history data and the inbound call history data stored in a work memory after receiving those data.

11 Claims, 7 Drawing Sheets

(56) References Cited

U.S. PATENT DOCUMENTS

| | | | |
|---|---|---|---|
| 2003/0114202 A1 | 6/2003 | Suh et al. | |
| 2003/0236615 A1 | 12/2003 | Kuroda et al. | |
| 2005/0070336 A1 | 3/2005 | Tamura | |
| 2006/0052141 A1 | 3/2006 | Suzuki | |
| 2006/0079182 A1 | 4/2006 | Matsuda | |
| 2006/0154698 A1* | 7/2006 | Ogura et al. | 455/569.1 |
| 2006/0195483 A1 | 8/2006 | Heider et al. | |
| 2006/0229014 A1 | 10/2006 | Harada et al. | |
| 2006/0262103 A1 | 11/2006 | Hu et al. | |
| 2007/0005368 A1 | 1/2007 | Chutorash et al. | |
| 2007/0015537 A1 | 1/2007 | DeBiasio et al. | |
| 2007/0063969 A1* | 3/2007 | Wright | 345/156 |
| 2007/0072650 A1 | 3/2007 | Matsuda | |
| 2007/0086579 A1 | 4/2007 | Lorello et al. | |
| 2007/0178944 A1 | 8/2007 | Mitsuru et al. | |
| 2008/0085745 A1 | 4/2008 | Ozaki | |
| 2008/0119222 A1 | 5/2008 | Piekarz | |
| 2008/0248797 A1 | 10/2008 | Freeman et al. | |
| 2009/0011799 A1 | 1/2009 | Douthitt et al. | |
| 2009/0033520 A1 | 2/2009 | Bailey | |
| 2010/0184376 A1 | 7/2010 | Matsuda | |
| 2011/0230140 A1 | 9/2011 | Matsuda | |

FOREIGN PATENT DOCUMENTS

| | | |
|---|---|---|
| JP | 2002-291044 | 10/2002 |
| JP | 2003-163965 | 6/2003 |
| JP | 2005-110048 | 4/2005 |
| JP | 2005-210181 | 8/2005 |
| JP | 2005-323265 | 11/2005 |
| JP | 2006-109292 | 4/2006 |
| JP | 2006-197481 | 7/2006 |
| JP | 2006-311143 | 11/2006 |
| JP | 2006-319946 | 11/2006 |
| JP | 2006-352462 | 12/2006 |
| JP | 2007-006211 | 1/2007 |
| JP | 2007-036806 | 2/2007 |
| JP | 2007-104343 | 4/2007 |
| KR | 2003-0000090 | 1/2003 |
| KR | 2004-0074808 | 8/2004 |
| RU | 2211159 | 8/2003 |
| RU | 45215 U1 | 4/2005 |
| WO | WO 2008/069299 | 6/2008 |

OTHER PUBLICATIONS

"Bluetooth SIG Press Releases" Internet Citation, Feb. 13, 2006.

The Extended EP Search Report dated Dec. 9, 2011 in a corresponding EP Application No. 08847839.1.

Office Action mailed Jun. 12, 2012 in corresponding Japanese Application No. 2007-290746 with English translation.

Notice of Allowance dated Mar. 22, 2012 in a corresponding Korean Application No. 10-2010-7001931.

Office Action dated Apr. 25, 2011 in corresponding Korean Application No. 10-2010-7001931 with English translation thereof.

Decision on Grant dated May 27, 2011 in corresponding Russian Application No. 2010-123170.

International Search Report (Japanese and English) and Written Opinion of the ISA (Japanese) for PCT/JP2008/003213, ISA/JP, mailed Jan. 6, 2009.

Examination Report dated Oct. 24, 2012 in corresponding European Application No. 08 847 839.1.

Office Action issued Feb. 23, 2013 in corresponding Chinese Application No. 200880112726.7 with English translation.

Office Action issued Aug. 20, 2013 in corresponding Japanese Application No. 2012-171910 with English translation.

* cited by examiner

US 8,688,175 B2

HANDSFREE APPARATUS FOR USE IN VEHICLE

CROSS-REFERENCE TO RELATED APPLICATION

The present application is a continuation application of U.S. Ser. No. 12/670,014, filed Jan. 21, 2010 which is a national phase filing of PCT/JP2008/003213 filed Nov. 6, 2008 which is based on and claims the benefit of priority of Japanese Patent Application No. 2007-290746, filed on Nov. 8, 2007, the disclosures of which is incorporated herein by reference.

TECHNICAL FIELD

This invention relates to an in-vehicle handsfree apparatus which establishes a communication line channel to a cellular phone that is brought into a short distance communication range.

BACKGROUND ART

The configuration of automatic transfer of telephone book data that represents relations between telephone numbers and registration names from a cellular phone to a handsfree apparatus in a vehicle is disclosed as, for example, an operation sequence of (a) establishing communication line between the cellular phone and the handsfree apparatus when the cellular phone is brought into the short distance communication range of the handsfree apparatus, and (b) automatically transferring, by the cellular phone itself, the telephone book data from the cellular phone to the handsfree apparatus. According to this configuration, the user can select a desired telephone number from among the telephone book data in the cellular phone for placing a call to that selected number. (See Japanese patent document JP-A-2002-193046, for example.)

Further, some of the cellular phones are configured to automatically transfer not only the telephone book data, but also outbound call history data, inbound call history data and the like. For example, according to Bluetooth (registered trademark) standard, development of a new profile (PBAP) that accommodates data transfer such as telephone book data, inbound/outbound call history data to the handsfree apparatus in the vehicle is considered, besides the existing handsfree profile (HFP) that is used to place and receive a call by using the handsfree apparatus in the vehicle.

SUMMARY

The present invention pays attention to simultaneously connecting HFP and PBAP, and, by transferring at least one of the outbound call history data, the inbound call history data, and the telephone book data at a certain timing to the handsfree apparatus, realizes a "real-time" update operation scheme of updating the inbound/outbound call history data that, as much as possible, transfers latest history data in the cellular phone to the handsfree apparatus.

In an aspect of the present invention, a control unit restarts, from a beginning, an initial connection process by a data transfer protocol by using a data transfer protocol connection unit after a cellular phone transits from a call receiving condition to a different communication condition by ending the call receiving condition, if the cellular phone receives a call while a handsfree call protocol connection unit is in a handsfree call protocol connected condition and the data transfer protocol connection unit is performing the initial connection process of the data transfer protocol.

By adopting the above-described operation scheme, the inbound call history data of the latest inbound call can be acquired by the restart of the data transfer protocol from the beginning of the initial connection process, when an arrival of a call (i.e., a reception condition of an inbound call) to the cellular phone during the initial connection process of the data transfer protocol transits to the different communication condition. Thus, the handsfree apparatus can have the latest inbound call history data transferred from the cellular phone. Further, by restarting the initial connection process of the data transfer protocol from the beginning after the transition of the reception condition to the different condition, the inbound call is determined either as a responded call or a missed call.

In another aspect of the present invention, the control unit restarts, from a beginning, a data transfer process of the data transfer protocol by using the data transfer protocol connection unit after a cellular phone transits from the call receiving condition to a different condition by ending the call receiving condition, if the cellular phone receives a call while a handsfree call protocol connection unit is in a handsfree call protocol connected condition and the data transfer protocol connection unit is performing data transfer.

By adopting the above-described operation scheme, the inbound call history data or a missed call history data of the latest inbound call can be acquired by the restart of the data transfer process of the data transfer protocol from the beginning, when an arrival of a call (i.e., a reception condition of an inbound call) to the cellular phone during the data transfer of the data transfer protocol transits to the different communication condition. Thus, the handsfree apparatus can have the latest inbound call history data transferred from the cellular phone. Further, by restarting the initial connection process of the data transfer protocol from the beginning after the transition of the reception condition to the different condition, the inbound call is determined either as a responded call or a missed call.

In yet another aspect of the present invention, the control unit at least receives, from the cellular phone, the outbound call history data, the inbound call history data, the missed call history data or the telephone book data of the cellular phone by the data transfer protocol by using the data transfer protocol connection unit if the cellular phone places an outbound call by an operation of the cellular phone while the handsfree call protocol connection unit is in the handsfree call protocol connected condition. Thus, at least the outbound call history data of the cellular phone is transferred by the data transfer protocol if the outbound call is placed by the operation of the cellular phone itself, thereby making it possible to perform a near-realtime update of the outbound call history data on the handsfree apparatus side.

In still yet another aspect of the present invention, the control unit receives, from the cellular phone, the outbound call history data of the cellular phone by the data transfer protocol by using the data transfer protocol connection unit if the handsfree apparatus places an outbound call while the handsfree call protocol connection unit is in the handsfree call protocol connected condition. Thus, at least the outbound call history data of the cellular phone is transferred by the data transfer protocol if the outbound call is placed by the operation of the handsfree apparatus itself, thereby making it possible to perform a near-realtime update of the outbound call history data on the handsfree apparatus side.

In still yet another aspect of the present invention, the control unit receives, from the cellular phone, at least one of the inbound call history data and the missed call history data by the data transfer protocol by using the data transfer protocol connection unit after the cellular phone transits from the call receiving condition to a different communication condition by ending the call receiving condition, if the handsfree call protocol connection unit is in the handsfree call protocol connected condition and the cellular phone is receiving the inbound call. Thus, after the transition of the call receiving condition to the different communication condition, the inbound call history data of the cellular phone regarding the latest inbound call as well as the missed call history data can be acquired by the handsfree apparatus, and the latest inbound call history of the cellular phone can be updated and reflected to the handsfree apparatus side. Further, after the transition from the call receiving condition to the different communication condition, the data transfer process by the data transfer protocol is restarted from the beginning thereby making it possible to determine whether the latest inbound call is a responded call or a missed call.

In still yet another aspect of the present invention, the control unit receives, from the cellular phone, at least one of the outbound call history data, the inbound call history data, the missed call history data and the telephone book data of the cellular phone through periodical data transfers by the data transfer protocol by using the data transfer protocol connection unit. Thus, the latest data of the inbound call history, the missed call history, or the outbound history of the cellular phone can be updated on the handsfree apparatus side.

In still yet another aspect of the present invention, the control unit connects the data transfer protocol of the data transfer protocol connection unit for receiving at least one of the outbound call history data, the inbound call history data, the missed call history data, and the telephone book data from the cellular phone. By the above operation scheme, the update of at least one of the latest data of the cellular phone, that is, at least one of the latest outbound call history, the latest missed call history, the latest inbound call history, and the latest telephone book of the cellular phone, can be performed on the handsfree apparatus side when the user of the handsfree apparatus performs an operation that displays, on a display screen of the handsfree apparatus, at least one of the outbound call history data, the inbound call history data, the missed call history data, and the telephone book data. In other words, reduction of unnecessary data transfer process can be achieved.

BEST MODE FOR CARRYING OUT THE INVENTION

Figure 1:
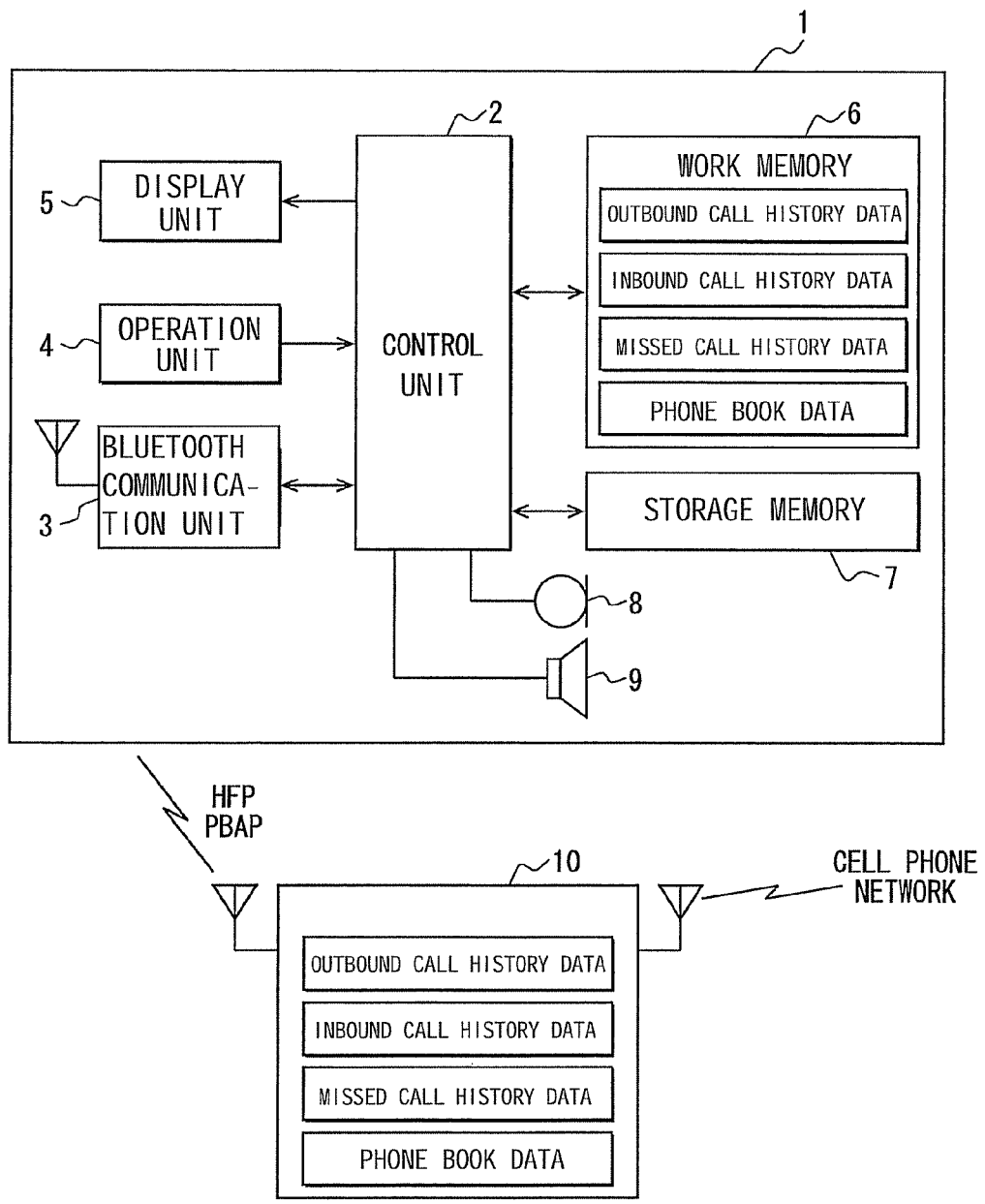
FIG. 1 is a function block diagram of an apparatus of the present invention.

An embodiment of the present invention implemented as a vehicle navigation apparatus having a handsfree function of Bluetooth communication capability (designated as a vehicle navigation apparatus hereinafter) is described with reference to the drawing. FIG. 1 shows an essential part of the invention as a function block diagram in the vehicle navigation apparatus. A vehicle navigation apparatus 1 has a control unit 2 (a control unit in claim language), the Bluetooth communication unit 3 (a handsfree call protocol connection unit, a data transfer protocol connection unit in claim language), an operation unit 4, a display unit 5, a work memory 6, a storage memory 7, a microphone 8 and a speaker 9.

The control unit 2 generally controls the apparatus operation such as a communication operation, a data management operation and the like of the vehicle navigation apparatus 1. The Bluetooth communication unit 3 is a wireless communication unit, and, if a cellular phone with the Bluetooth communication capability (simply designated as a cellular phone hereinafter) 10 is within a Bluetooth communication range, it performs communication with the cellular phone 10 according to the Bluetooth communication standard by establishing a wireless communication channel.

The Bluetooth communication unit 3 in the present embodiment supports a well-known HFP (Handsfree Profile) for performing a handsfree call and a PBAP (Phone Book Access Profile) for transferring a telephone book data, outbound call history data, inbound call history data and the like. These profiles are communication protocols for respectively defining designated functions.

The cellular phone 10 is, by itself (i.e., when the HFP is not connected with a handsfree apparatus), as general knowledge, configured to place and receive a call by establishing a cellular phone channel with a station (not shown in the drawing) of a cellular phone network. In this case, when, for example, a user operates a dial key (number keys of "0" to "9") (not shown in the drawing) for inputting a telephone number and presses a talk key (not shown in the drawing), a call is placed according to the input number for connecting to a cellular phone. Further, when the cellular phone 10 receives a call reception signal from the station in response to a call that is placed by another phone with the telephone number of the cellular phone 10 according to a call reception process, the cellular phone 10 receives the caller's telephone number from the station as an inbound call number, and accepts the call by an operation of the talk key by the user.

In addition, the cellular phone 10 has a clock (not shown in the drawing) for calculating date and time, and stores, as outbound call history data, data that associates the inputted telephone number in the above call placement process with the calling date/time based on the time from the clock for each of the multiple outbound calls as well as storing, as inbound call history data, data that associates the caller's telephone number received from the station by the call reception process with the reception date/time based on the time from the clock for each of the multiple inbound calls. Further, data that associates a telephone number of un-answered call from the station with the date/time based on the time from the clock is stored for each of the multiple missed calls as missed call history data, and data that associates a telephone number with a registration name for each of multiple entries is stored as telephone book data. The telephone book data includes, for example, data entries of about 500 items inputted by the user to be stored in a non-volatile memory (not shown in the drawing).

When the telephone book data is stored, both of the outbound call history data and the inbound call history data mentioned above include the above registration names. More practically, the caller's telephone number received from the station is the telephone number registered in the telephone book, and, after examining that the telephone number has the corresponding registration name in the telephone book, the inbound call history data is stored as a combination of the telephone number, the inbound call date/time, and the registration name. The missed call history data is stored in the same manner as a combination of the telephone number, the inbound call date/time, and the registration name. The outbound call history data is also stored in the same manner, after the examination of the outbound call number used in the call placement process, as a combination of the outbound call number, the outbound call date/time and the registration name, if the outbound call number is found in the telephone book.

Thus, the user can place a call without bothering to input all digits of a telephone number, that is, with a simple operation of retrieving the number data from the telephone book and choosing one of the telephone numbers therefrom. In this case, the cellular phone 10 can store, for example, 20 entries respectively in the outbound call history data, in the inbound call history data, and in the missed call history data, with the automatic erasure of the oldest data among the entries for the update purposes, everytime one of the call placement process, the call reception process, and the missed call handling process is performed.

The cellular phone 10 supports the well-known HFP for handsfree call, and the PBAP for the data transfer of the telephone book data, the outbound call history data and the inbound call history data. When the cellular phone 10 supports the PBAP that defines automatic transfer of the outbound call history data and inbound call history data, the PBAP is connected right after communication channel is established with the Bluetooth communication unit 3, and the telephone book data memorized at the moment are transferred automatically, and the outbound call history data and inbound call history data as well as the missed call history data memorized at the moment are transferred automatically afterwards. When there is the vehicle navigation apparatus 1 within the range of Bluetooth communication, by the above operation scheme, the cellular phone 10 automatically transfers the outbound call history data having the maximum of 20 entries from past call processes that are performed by the cellular phone 10 itself, as well as automatically transferring the inbound call history data and the missed call history data having the same number of entries.

The operation unit 4 is composed of, for example, a touch key formed on the display unit 5, and outputs, to the control unit 2, the operation signal representing the user operation when it detects the user operation performed on the touch key. The display unit 5 displays a display screen according to a display signal input from the control unit 2, that is, displays a screen with the arrangement of numeral keys of "0" to "9," as a telephone number input screen for the user. The work memory 6 is composed of a volatile memory, and stores the outbound call history data, the inbound call history data, the missed call history data, and the telephone book data which are transferred automatically from the cellular phone 10 without a user operation. In this case, the work memory 6 can store, for example, 5 entries of each of the outbound call history data, the inbound call history data, and the missed call history data. The storage memory 7 is composed of a non-volatile memory, and stores various data.

In this case, when the user gives a display request for displaying the inbound call history data, the control unit 2 controls the display unit 4 to display the inbound call history data stored in the work memory 6, and when the user sends a display request for displaying the outbound call history data, the control unit 2 controls the display unit 4 to display the outbound call history data stored in the work memory 6, and when the user sends a display request for displaying the telephone book data, the control unit 2 controls the display unit 4 to display the telephone book data stored in the work memory 6. The vehicle navigation apparatus 1 of the present embodiment stores 5 entries of each of the outbound/inbound call history data in the work memory 6, and thus the maximum number of entries displayed on the display unit 4 is five for each of the outbound/inbound call history data.

The microphone 8 inputs sound that a user uttered for a handsfree call by using the cellular phone 10, and the speaker 9 outputs a caller's voice for a handsfree call by using the cellular phone 10. That is, in other words, when the Bluetooth communication channel is established between the Bluetooth communication unit 3 and the cellular phone 10 with the HFP connection associated thereto, the control unit 2 transfers, from the Bluetooth communication unit 3, sound that is input from the microphone 8 to the cellular phone 10, and further transfers it to a telephone network from the cellular phone 10 for conveying the sound to the cellular phone network, and controls the Bluetooth communication unit 3 to receive sound from the cellular phone 10 after receiving the sound from the cellular phone network by using the cellular phone 10, for the purpose of outputting sound from the speaker 9.

In addition, the vehicle navigation apparatus 1 mentioned above has, besides the function blocks shown in the drawing, other function blocks such as a GPS unit that serves as a position detector for detecting a current position of the vehicle, a route search unit for finding a route from the current position to a destination, a map data read unit for reading map data from a record medium, a VICS information reception unit for receiving VICS information delivered from the VICS center, a voice recognition unit for recognizing user's voice, together with other units, which are required for the navigation operation (VICS: Vehicle information and Communication Service implemented in Japan).

In addition, the vehicle navigation apparatus 1 mentioned above is configured to be tuned on and off (i.e., to receive/stop a power supply) in association with an ON/OFF operation of an ACC switch. Therefore, when the ACC switch is switched from ON to OFF for causing the power supply to be terminated and causing a power unit of the vehicle navigation apparatus 1 to be turned off according to a user operation, for example, various data stored in the storage memory 7 just before turning off is configured not to be erased (i.e., retained in the memory 7). However, the outbound call history data, the inbound call history data, the missed call history data, and the telephone book data having been stored in the work memory 6 just before turning off are configured to be erased.

The operation of the above-described configuration is described with reference to FIGS. 2 to 10. In this case, the cellular phone 10 is assumed to be already storing 20 entries of the outbound call history data and 20 entries of the inbound call history data, which are the maximum number of storable entries. Further, as an assumption, the user carrying the cellular phone 10 approaches the vehicle and gets into the vehicle with those history data stored in the cellular phone 10, to bring the cellular phone 10 into the Bluetooth communication range of the vehicle navigation apparatus 1.

Figure 2:
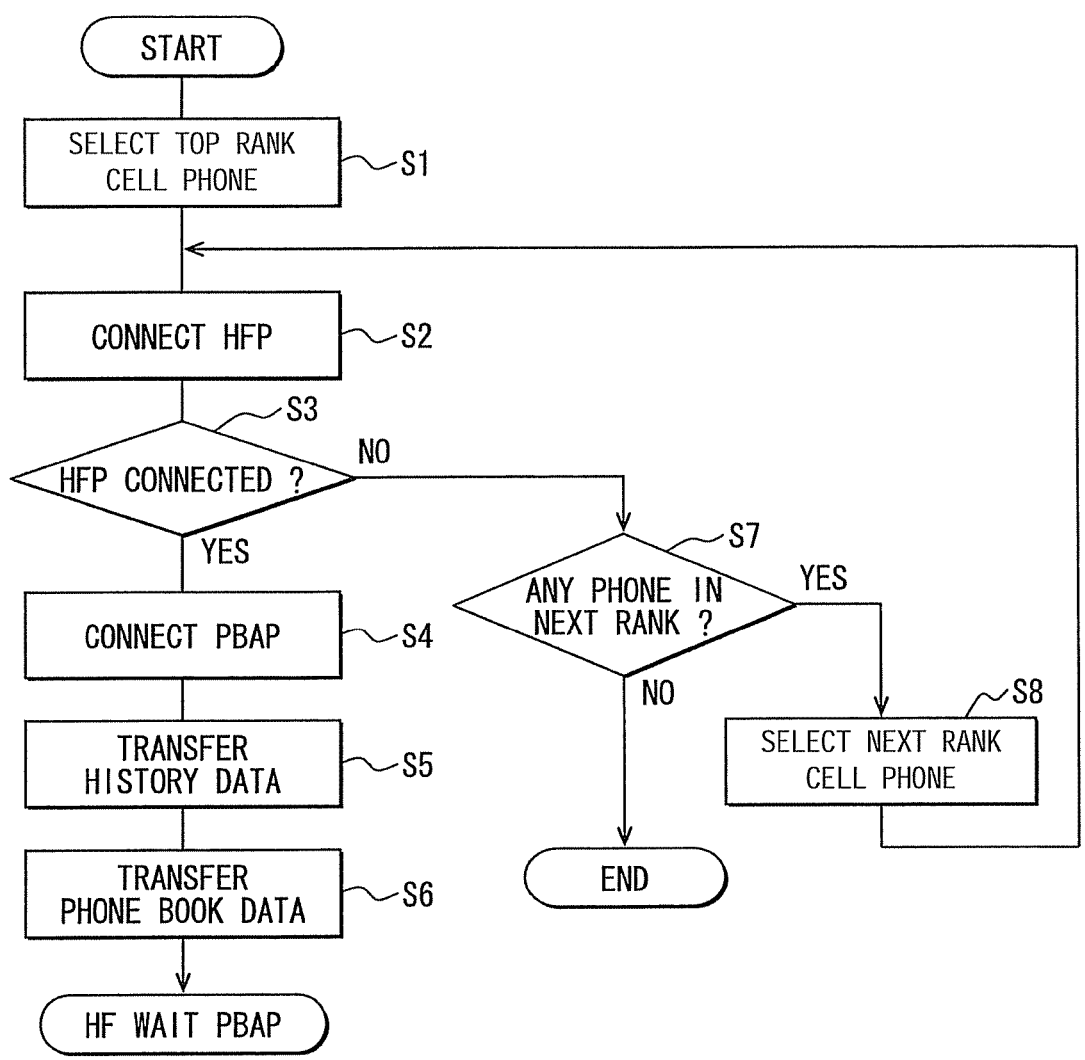
FIG. 2 is a flowchart of a reception procedure.

First, a process, for receiving data from the cellular phone 10, by the control unit 2 of the vehicle navigation apparatus 1 is described with reference to FIG. 2. The received data includes the outbound call history data, the inbound call history data, the missed call history data and the telephone book data. In this case, the user already has, on the vehicle navigation apparatus 1, a registration of the cellular phone 10 that is to communicate the vehicle navigation apparatus 1 through the Bluetooth communication. That is, for example, a four-digit password is input to generate and register a link key that is shared by both of the cellular phone 10 and the vehicle navigation apparatus 1 after generating the key on either of the two sides (on the cellular phone 10 or on the navigation apparatus 1) at the time of initial communication, for each of the cellular phones 10 to be used with the navigation apparatus 1. Then, the link key is used for authentication of the cellular phone 10 at the time of selecting the cellular phone 10 to be connected. That is, no cellular phone 10 can be connected by HFP/PBAP connection, if the cellular phone 10 has not been registered to the navigation apparatus 1. Basically, a vehicle owner's cellular phone is registered to the navigation apparatus 1.

In the present embodiment, the vehicle navigation apparatus 1 has registration of multiple cellular phones 10 that serve as communication objects, and, priority of each of the multiple cellular phones 10 is determined, for example, by an operation of the operation unit 4. The determined priority is stored in the control unit 2. This is because there is a case where one user owns multiple units of the cellular phone 10.

As another assumption of the present embodiment, the Bluetooth communication unit 3 of the vehicle navigation apparatus 1 supports both of the HFP protocol and the PBAP protocol, and also supports simultaneous connection of the two profiles (i.e., a multi-profile connection). In this case, the simultaneous connection takes one of two following forms. That is, in the Bluetooth standard, one master communication device can have up to seven slave communication devices simultaneously connected thereto by time division multiplexing, and the communication channels are established as seven independent time division channels. Therefore, the two channels out of seven may be used to establish one HFP connection and one PBAP connection. Further, a logical channel in one communication channel may be shared by the HFP and PBAP, as is the channel in the packet communication, for simultaneous operation. The above-described two forms are designated as the simultaneous connection in the present embodiment.

The explanation is resumed to describe the control unit 2 that selects a high priority cellular phone 10 (i.e., a top rank phone in FIG. 2) as a connection object of HFP (step S1). In the present embodiment, communication by HFP is firstly tried without trying a communication connection by PBAP. The reason of this operation scheme is described later. Then, the control unit 2 connects HFP for the selected cellular phone 10 (step S2), and determines whether the connection of HFP is successful (step S3). When the control unit 2 determines that the connection of HFP is successful (step S3, YES), the control unit 2 tries the connection of PBAP to the cellular phone 10 which has a successful connection of HFP (step S4). The connection described here is the initial connection process that is necessary to establish a communication link to perform data transfer by PBAP.

Subsequently, data transfer process of the outbound call history data, the inbound call history data, and the missed call history data is performed (step S5). When the data transfer process of the outbound call history data, the inbound call history data, and the missed call history data is finished, the transfer process of the telephone book data is started for transferring the telephone book data (step S6). By the process described above, transition to the handsfree waiting process is performed, thereby enabling a call reception by using the operation unit 4 for establishing a call being placed to the cellular phone, and/or enabling a call placement by using the operation unit 4 for placing a call from the cellular phone, as well as enabling PBAP connected condition for the data transfer by using PBAP. That is, in other words, the simultaneous connection is being enabled by using the Bluetooth communication.

In contrast, when the control unit 2 determines that the HFP connection is not successful (i.e., the HFP connection fails) (step S3, NO), it determines if the next priority cellular phone 10 (i.e., a next rank phone in FIG. 2) exists (step S7), and selects the next priority cellular phone 10 as the HFP communication object (step S8) if it exists (step S7, YES), and returns to step S2 for repeating the above process.

As described above, the data transfer by PBAP is performed and HFP is connected simultaneously for maintaining a handsfree call waiting condition (hereinafter simply designated as the "waiting condition" in some cases), when the cellular phone 10 is brought close to the vehicle navigation apparatus 1 and wireless connection by Bluetooth is established. The data transfer by PBAP is further described in details in the following description.

In the present embodiment, if the cellular phone 10 exists within the Bluetooth communication range as described in the above description, the control unit 2 tries to connect to the within-the-range cellular phone 10 only by HFP first for staying in the handsfree call waiting condition, and performs the initial connection process of PBAP afterwards.

The reason of the above operation scheme is, that, as the operation of the vehicle navigation apparatus 1, the simultaneous initial connections by both of HFP and PBAP result in (a) a too-heavy process load of simultaneous operations, and (b) too-complicated software structure for handling the simultaneous operations, and further result in (c) a delayed completion of the HFP connection. Therefore, by adopting the operation scheme of the present embodiment, the two connections of HFP and PBAP can be established stably and securely. Further, the time required for establishing the HFP connection can be reduced, thereby making it possible for the navigation apparatus 1 to reach, in a reduced amount of time, the handsfree call waiting condition that enables the call placement process and the call reception process when the cellular phone 10 is brought into the vehicle by the user.

Figure 3:
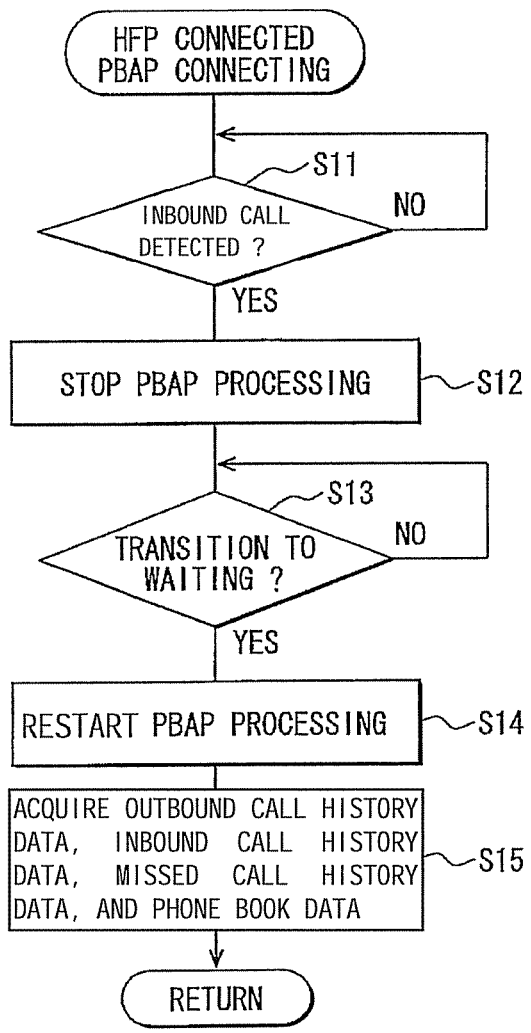
FIG. 3 is a flowchart of a connection process.

In the above-described situation, if the cellular phone 10 is determined to be receiving an inbound call (step S11, YES) when the HFP connected condition has been established and the PBAP connection process is being performed (i.e., the process in step S4), the PBAP connection process is stopped (step S12), and whether one of (a) the call reception condition regarding the inbound call and (b) the call established condition regarding the inbound call has ended to transit into the handsfree call waiting condition is determined (step S13), as shown in FIG. 3. In this case, information for determining if the navigation apparatus 1 is in the handsfree call waiting condition or not is notified by HFP, everytime the communication condition (i.e., the handsfree call waiting condition, the call placement process/call reception process/call established condition (i.e., talking condition)) of the cellular phone 10 is changed. Further, this communication condition determination information may be received/acquired by (i.e., may be transferred to) the vehicle navigation apparatus 1 upon having a request from the navigation apparatus 1.

Then, the control unit 2 restarts the PBAP connection process from the beginning (step S14), and acquires, from the cellular phone 10, the outbound call history data, the inbound call history data, the missed call history data, and the telephone book data (step S15) upon determining that the navigation apparatus has transited to the handsfree call waiting condition (step S13, YES) based on one of (a) refusal of the inbound call by the navigation apparatus 1 (e.g., in a do-not-disturb mode), (b) refusal of the inbound call by the cellular phone 10, (c) the call either cancelled or ended on the caller's side, or (d) the call ended by the operation either on the cellular phone 10 or on the navigation apparatus 1. In this manner, even when the cellular phone 10 receives an inbound call while it is involved in the PBAP connection process, the PBAP connection process is restarted from the beginning after transition to the handsfree waiting condition either from the call reception condition or from the call established condition, thereby enabling an appropriate acquisition of the outbound call history data, the inbound call history data, the missed call history data, and the telephone book data from the cellular phone 10, that is, those data are kept in synchronization with the data on the cellular phone 10. In particular, the vehicle navigation apparatus 1 can acquire, as the inbound call history data, the inbound call history data regarding the inbound call processed in S11.

In addition, when the call reception condition transits to the waiting condition in S14, the PBAP connection process is restarted from the beginning for the following reasons. That is, when the call reception condition is detected, new inbound call history data is generated in the cellular phone 10. Thus, while it is possible to restart the initial connection process of PBAP at the time of detection of the inbound call, it is not yet determined that the inbound call in question is (a) a missed call or (b) a responded call, if the inbound call is still ringing when the initial connection process has been performed to start the data transfer. Therefore, even if the new inbound call history data is received by the navigation apparatus 1 in the above-described situation, the navigation apparatus 1 can not distinguish the received data as one of the missed call or the responded call, thereby making it impossible to display the data in a distinguished condition. In view of the above situation, the PBAP connection process and the data transfer are restarted from the beginning at one of the two timings of (a) when the call reception condition transits to a different condition, that is, at a transition timing from the call reception condition to the waiting condition without going through the call established condition, or (b) when the call reception condition transits to the call established condition.

In the present embodiment, because transition to finally coming to the waiting condition is expected, either from the call reception condition through the call established condition or from the call reception condition without going through the call established condition, the PBAP connection is restarted from the beginning upon detecting the handsfree call waiting condition. However, the detection of the call established condition based on the call reception condition may trigger the PBAP connection.

Figure 4:
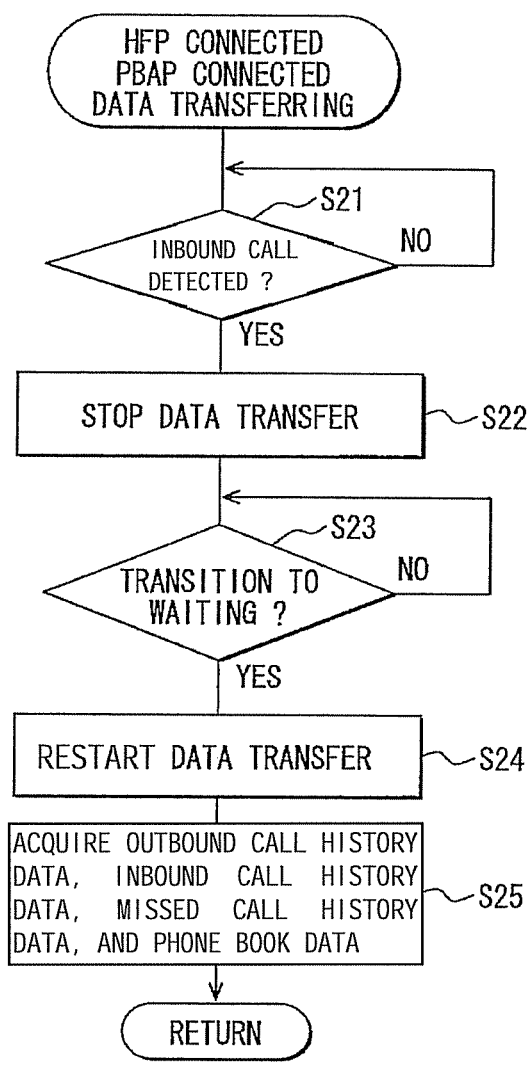
FIG. 4 is a flowchart of an inbound call receiving process during data transfer.

In FIG. 3, a process for a situation where the inbound call is detected at the time of HFP connected condition together with the PBAP initial connection process being performed is described. In FIG. 4, a process for a different situation where the inbound call is detected at the time of HFP connected condition and the PBAP connected condition, accompanied by the data transfer (transfer of the outbound call history data, the inbound call history data, the missed call history data, and the telephone book data) in progress, is described. The situation in FIG. 4 corresponds to a sequence in FIG. 3 that the PBAP connection process has ended while the process is determined as NO in S11, succeeded by transition to the data transfer process and the data transfer now being in progress, or, corresponds to the data transfer in progress in S15.

In FIG. 4, when the control unit 2 determines that the cellular phone 10 in the HFP connected condition and the PBAP connected condition with the data being transferred detects an inbound call (step S21, YES), the control unit 2 stops the data transfer (step S22), and then it determines whether one of the call reception condition of the inbound call and the call established condition subsequent to the reception of the inbound call has transited to the handsfree call waiting condition (step S23). Then, if the condition is determined to have transited to the handsfree call waiting condition, due to (a) the call refusal by the vehicle navigation apparatus 1, (b) the call refusal by the cellular phone 10, (c) the call cancellation by the caller, or (d) end of the call (step S23, YES), the control unit 2 restarts the data transfer from the beginning (step S24), for the purpose of acquiring, from the cellular phone 10, the outbound call history data, the inbound call history data, the missed call history data, and the telephone book data (step S25). In this manner, even when the cellular phone 10 receives a call in the PBAP connected condition with the data being transferred, the outbound call history data, the inbound call history data, the missed call history data, and the telephone book data can be appropriately acquired from the cellular phone 10 by restarting the PBAP connection process from the beginning, after transition from the call reception condition/call completion to the call waiting condition, thereby making it possible for the navigation apparatus 1 to be in the data-synchronized condition with the cellular phone 10. In particular, as the inbound call history data of the vehicle navigation apparatus 1, the data of the inbound call that has been received by the process in S21 can be acquired. In this case, in S24, the PBAP connection restarted from the beginning at the time when the call reception condition has transited to the handsfree call waiting condition, due to the same reason as the reason for the operation in S14, which has been described in the above description.

The description in the above explains a situation that the cellular phone 10 is brought into the inside of the vehicle, to be connected to the vehicle navigation apparatus 1 by HFP connection and PBAP connection for data transfer for the first time. In the following, a process that uses the simultaneous connections after the successful data transfer by PBAP connection will be described.

In the present embodiment, when the data transfer by PBAP has finished, the PBAP connection itself is kept uninterrupted, that is, HFP and PBAP are in the simultaneously connected condition. In this condition, the data transfer by PBAP can be started at a certain timing, based on a request from the navigation apparatus 1, or based on a "self" judgment on the cellular phone 10. Therefore, the navigation apparatus 1 serves as a vehicle handsfree apparatus/system that is enabled to have an update of the latest outbound/inbound/missed call history data of the cellular phone 10, even when a new inbound/outbound call is placed. How this effect can be achieved is described with reference to FIGS. 5 to 10.

As an assumption, the following conditions are expected. That is, in S2, if the cellular phone 10 has an inbound call after the connection by HFP, the inbound call history data and the outbound call history data are stored in a memory of the cellular phone 10, because those history data are regarding the call history of the cellular phone 10 itself. Further, if an outbound call is placed from the cellular phone 10 through the Bluetooth communication unit 3 under control of the operation unit 4 in S2 after the connection by HFP, the cellular phone 10 stores the outbound call history data in the memory of the cellular phone 10 itself, because the telephone number of the call destination is sent to the cellular phone 10 from the Bluetooth communication unit 3. That is, the call history data is the history data of the cellular phone 10 itself.

Figure 5:
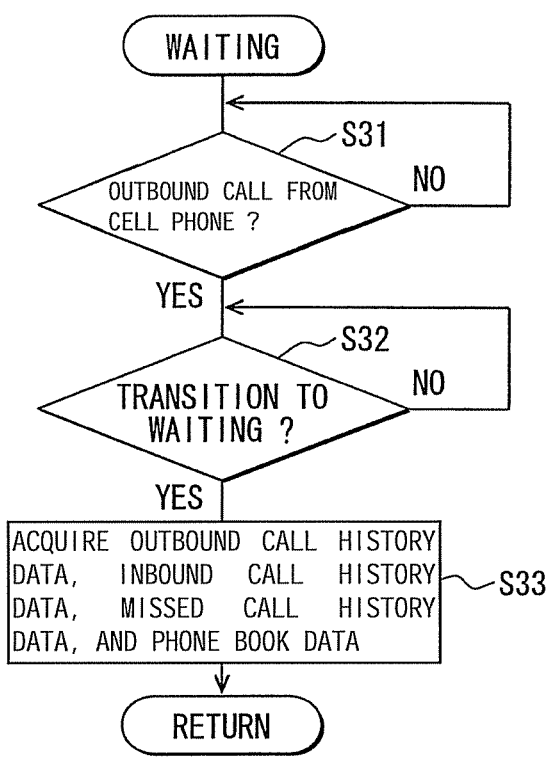
FIG. 5 is a flowchart of a data transfer process after placing an outbound call.

In FIG. 5, the data transfer process at the time when the call placement process is performed under control of the operation of the operation unit in the cellular phone 10 is described. When the cellular phone 10 and the vehicle navigation apparatus 1 are in the connected condition by HFP, it is possible, as described above, that an outbound call placement process is performed under control of the operation of the operation unit 4 of the vehicle navigation apparatus 1. In addition, a handsfree call can be placed by performing the call placement process under control of the operation of the cellular phone 10 in the HFP connected condition.

In this case, it is required for the vehicle navigation apparatus 1 to acquire the outbound call history data by this outbound call placement process, in order to update the history data to the latest condition. Because the vehicle navigation apparatus 1 can determine whether the outbound call is initiated by the navigation apparatus 1 or not, and the communication condition of the cellular phone 10 is notified through the HFP connection, the vehicle navigation apparatus 1 can determine whether the outbound call is placed by the operation of the operation unit 4 itself, or is placed by the operation of the cellular phone 10.

Therefore, if it is determined by the control unit 2 that an outbound call is placed by the cellular phone 10 in FIG. 5 (step S31, YES) in the waiting condition, whether the call placement condition of the outbound call has ended to transit to the waiting condition is determined (step S32). For example, when (a) the navigation apparatus 1 has cancelled the outbound call placed by the cellular phone 10, (b) the cellular phone 10 has cancelled the outbound call placed by itself, or (c) the outbound call is refused on the call destination side, the call placement condition transits to the waiting condition without going through the call established condition (step S32, YES). After that, the outbound call history data, the inbound call history data, the missed call history data, and the telephone book data are acquired from the cellular phone 10 (step S33). In this manner, the call history data can be acquired from the cellular phone 10 whenever the outbound call from the cellular phone 10 has ended, thereby enabling those data (the outbound call history data, the inbound call history data, the missed call history data and the telephone book data) to be maintained in the same condition as the data in the cellular phone 10. Further, instead of determining transition to the waiting condition in S32 in the above example, the process may proceed to S33 when determining transition to the call placement condition.

Figure 6:
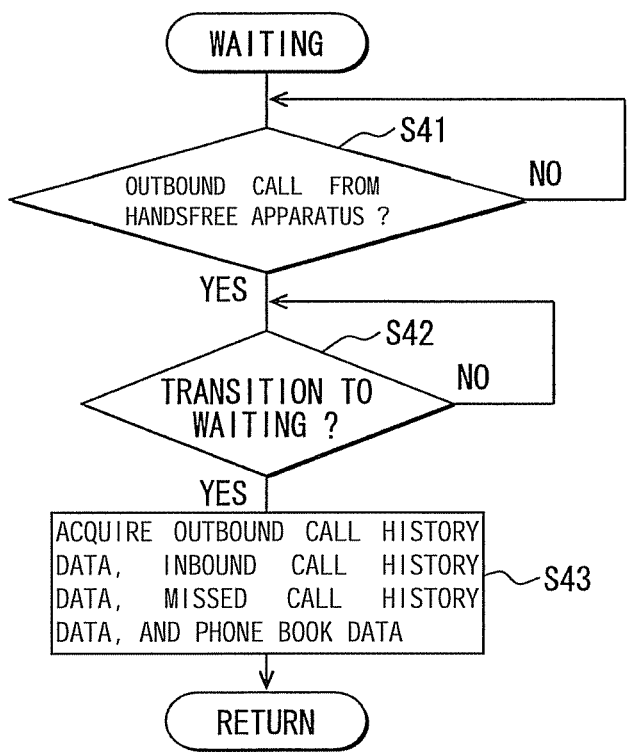
FIG. 6 is another flowchart of the data transfer process after placing the outbound call.

Next, FIG. 6 is explained. In FIG. 5, the call placement operation in the cellular phone 10 is detected, and the data transfer is performed in S33. However, in FIG. 6, the call placement process is started by the operation unit 4 of the vehicle navigation apparatus 1.

In FIG. 6, when it is determined by the control unit 2 that the outbound call is placed by the vehicle navigation apparatus 1 in the waiting condition (step S41, YES), whether the call placement condition has ended to transit to the waiting condition is determined (step S42). For example, this situation of S42 possibly follows when (a) the navigation apparatus 1 has cancelled the outbound call placed by itself, (b) the cellular phone 10 has cancelled the outbound call placed by the navigation apparatus 1, or (c) the outbound call is refused on the call destination side. If it is determined that the call placement condition has transited to the waiting condition without going through the call established condition in S42, the outbound call history data, the inbound call history data, the missed call history data, and the telephone book data are acquired from the cellular phone 10 (step S43). In this manner, whenever the call placement from the vehicle navigation apparatus 1 has ended, the outbound call history data, the inbound call history data, the missed call history data, and the telephone book data can be acquired from the cellular phone 10, and the same data as the cellular phone 10 can be stored. In addition, in this example, the transition to the waiting condition is determined in S42. However, the process may proceed to S43 when the call placement condition is detected.

Figure 7:
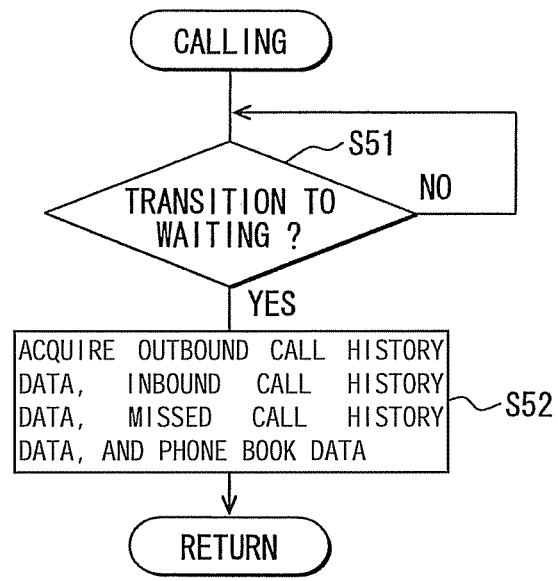
FIG. 7 is a modification of the flowchart of the data transfer process after placing the outbound call.

Next, FIG. 7 is explained. FIG. 7 is a modification of the example shown in FIGS. 5 and 6. That is, a situation where the data transfer is performed when the call established condition has transited to the waiting condition, instead of a transition from the call placement condition to the waiting condition without going through the call established condition.

In FIG. 7, the control unit 2 acquires the outbound call history data, the inbound call history data, the missed call history data, and the telephone book data from the cellular phone 10 (step S52), when it is determined that transition to the waiting condition has occurred in the call established condition of the handsfree call by using both of the navigation apparatus 1 and the cellular phone 10, or by using the cellular phone 10 only, due to (a) the call termination by the navigation apparatus 1, (b) the call termination by the cellular phone 10, or (c) the call termination by the call destination side (step S51, YES). In this manner, whenever the call has ended, the outbound call history data, the inbound call history data, the missed call history data, and the telephone book data can be acquired from the cellular phone 10, and the same data as the cellular phone 10 can be stored.

Figure 8:
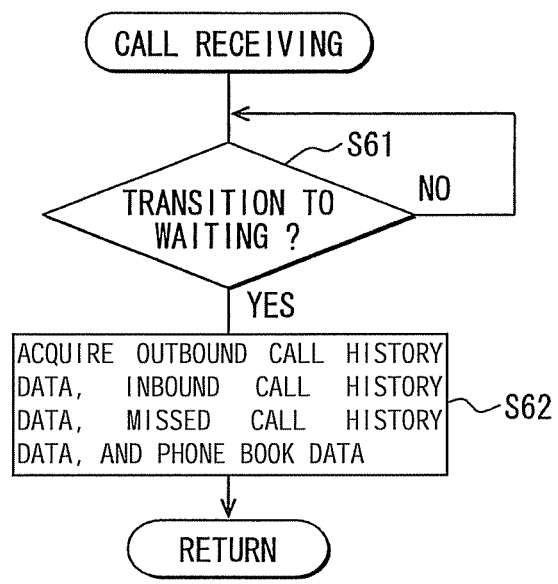
FIG. 8 is a flowchart of the data transfer process after receiving an inbound call.

FIG. 8 is a process that handles call reception of an inbound call. In FIG. 8, the control unit 2 acquires the outbound call history data, the inbound call history data, the missed call history data, and the telephone book data from the cellular phone 10 (step S62), when it is determined that transition to the waiting condition has occurred in the call reception condition, due to (a) the call refusal by the navigation apparatus 1, (b) the call refusal by the cellular phone 10, (c) the call cancellation by the call destination side, or (d) end of the call after call reception and talking (step S61, YES). In this manner, whenever the call reception has ended, the outbound call history data, the inbound call history data, the missed call history data, and the telephone book data can be acquired from the cellular phone 10, and the same data as the cellular phone 10 can be stored.

In addition, it may be possible to transfer data right after transition from the waiting condition to the call reception condition. However, if the data is transferred right after the transition to the call reception condition, the inbound call just received cannot be determined as one of a missed call or a responded call. Therefore, in the present embodiment, after the determination of being in the waiting condition transited either from a call-missed condition or from a call-responded condition, the waiting condition is used as a trigger of data transfer from the cellular phone 10, thereby allowing a display screen to be generated for displaying that the just-received call has been a missed call or a responded call.

Figure 9:
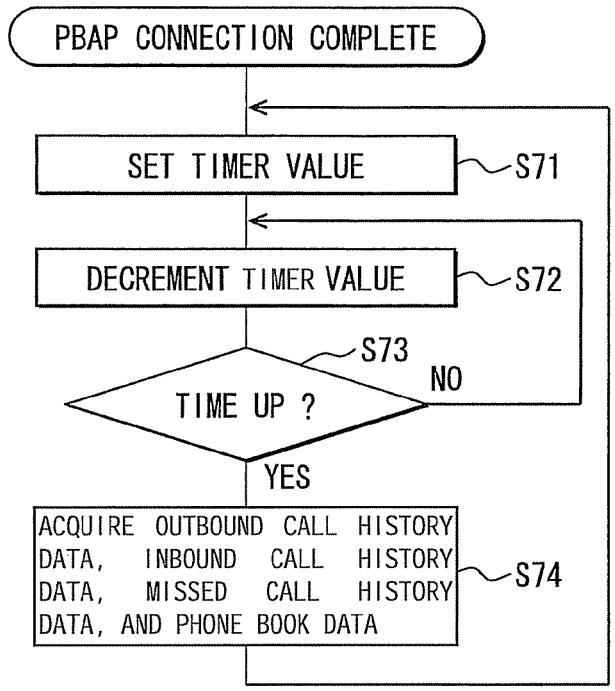
FIG. 9 is a flowchart of the data transfer process by using a timer.

FIG. 9 describes use of a timer for starting the data transfer, instead of using, as the start timing, the communication condition such as the call placement condition, the call reception condition, or the call established condition (i.e., a talk condition). In FIG. 9, the control unit 2 acquires the outbound call history data, the inbound call history data, the missed call history data, and the telephone book data from the cellular phone 10 (step S74), when it establishes the PBAP connection, sets a timer value (step S71), decrements the timer value at a predetermined interval (step S72), and determines a time-up of the set timer value (step S73). In this manner, the outbound call history data, the inbound call history data, the missed call history data, and the telephone book data can be acquired from the cellular phone 10, and the same data as the cellular phone 10 can be stored.

Figure 10:
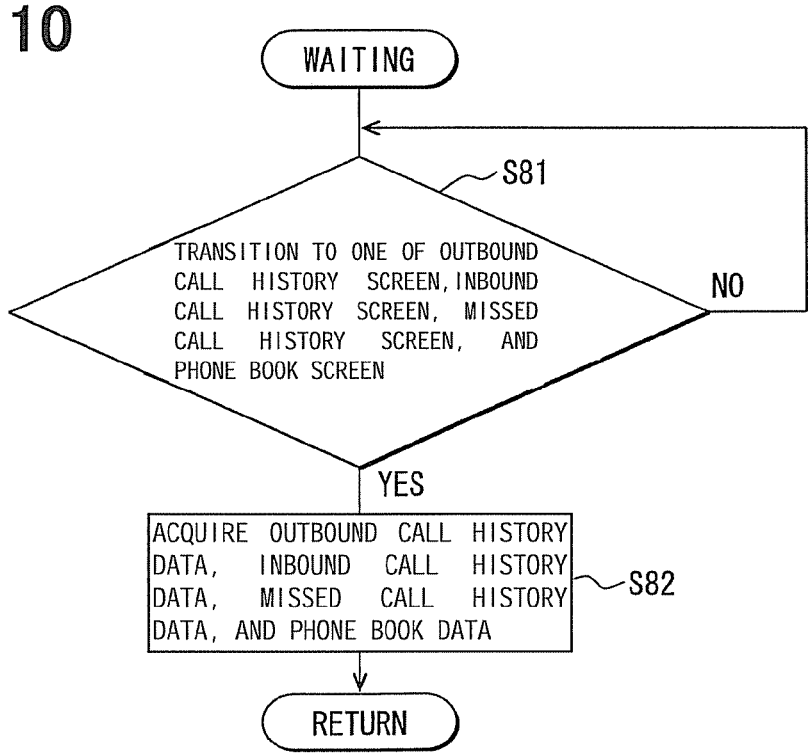
FIG. 10 is a flowchart of the data transfer process by an operation of a user.

FIG. 10 describes a situation where, instead of using the communication condition or the timer as the start timing, the data transfer is started (i.e., triggered) by the operation of the operation unit 4 by the user. In FIG. 10, the control unit 2 acquires the outbound call history data, the inbound call history data, the missed call history data, and the telephone book data from the cellular phone 10 (step S82), when it determines that transition to one of an outbound call history data screen, an inbound call history data screen, a missed call history data screen, or a telephone book data screen has occurred, due to the user operation on the operation unit 4 (step S81, YES). In this manner, the outbound call history data, the inbound call history data, the missed call history data, and the telephone book data can be acquired from the cellular phone 10, whenever transition to one of the outbound call history data screen, the inbound call history data screen, the missed call history data screen, or the telephone book data screen has occurred, and the same data as the cellular phone 10 can be stored.

In the processes shown in FIGS. 5 to 10, the vehicle navigation apparatus 1 is configured to receive the outbound call history data, the inbound call history data, the missed call history data, and the telephone book data at a predetermined timing. However, due to the data conversion time of the telephone book data to the vCard format, or due to the large data volume of the telephone book data in comparison to the outbound call history data, the inbound call history data, or the missed call history data, the transfer of the telephone book data may cause the decrease of the battery of the cellular phone 10.

Therefore, if the cellular phone 10 is wirelessly connected to the vehicle navigation apparatus 1 and the data transfer is performed by PBAP, only the outbound call history data, the inbound call history data, and the missed call history data may be transferred at the above predetermined timing. In this manner, the process on the cellular phone 10 can be reduced, thereby preventing the decrease of the battery of the cellular phone 10.

In addition, the vehicle navigation apparatus 1 is configured to receive the outbound call history data, the inbound call history data, the missed call history data, and the telephone book data at a predetermined timing. However, only the inbound call history data and the missed call history data may be transferred upon receiving the inbound call, and only the outbound call history data may be transferred upon placing the outbound call. As a result, unnecessary data transfer is prevented, and the process load on the cellular phone 10 is reduced, thereby preventing the decrease of the battery of the cellular phone 10.

In addition, the processes illustrated in FIGS. 5 to 10 may separately be performed, or may be performed in combination. Preferably, all of the processes in FIGS. 5 to 9 may be performed in combination.

The processing of the transferred data is explained in the following. The control unit 2 performs the following process for storing the transferred data in the work memory 6 when the data transferred from the cellular phone 10 is large in comparison to the storage capacity of the work memory 6. More practically, the above process is required when the number of data entries automatically transferred from the cellular phone 10 is respectively 20 for the data of the outbound call history data, the inbound call history data, and the missed call history data, while the data storage capacity of the work memory 6 for each category allows only 5 entries, which is smaller than the number of transferred entries.

The control unit 2 discards the old entries of the outbound call history data that has the older outbound call date/time from among the outbound call history data auto-transferred from the cellular phone 10, and stores only 5 newest entries out of 20 entries of the outbound call history data in a prioritized manner in the work memory 6, as the outbound call history data of the cellular phone 10. In the same manner, the control unit 2 discards the old entries of the inbound call history data and old entries of the missed call history data that has the older inbound call date/time from among the inbound call history data auto-transferred from the cellular phone 10, and stores only 5 newest entries out of 20 entries of the inbound call history data in a prioritized manner in the work memory 6, as the inbound call history data of the cellular phone 10.

Alternatively, the number of entries to be auto-transferred from the vehicle navigation apparatus 1 to the cellular phone 10 by PBAP connection may be specified (e.g., the number is specified as 5 entries in the present embodiment) for storing the outbound call history data, the inbound call history data, and the missed call history data having the new call date/time in a prioritized manner in the work memory 6.

In addition, it is required for the cellular phone 10 to convert the data format of the telephone book data of the cellular phone 10 into a "vCard" format that is defined in the Bluetooth communication standard when it transfers the telephone book data. Further, the data update frequency of the telephone book data is lower than the update frequency of the outbound call history data and the inbound call history data. Therefore, the control unit 2 may receive the outbound call history data, the inbound call history data, and the missed call history data by the Bluetooth communication unit 3, before receiving the telephone book data from the cellular phone 10 by the Bluetooth communication unit 3. Further, the control unit 2 may receive the outbound call history data and the inbound call history data from the cellular phone 10 by the Bluetooth communication unit 3, and may receive the telephone book data from the cellular phone 10 by the Bluetooth communication unit 3 only when the user performs a predetermined operation on the operation unit 4.

In the above description, the data (the outbound call history data, the inbound call history data, the missed call history data, and the telephone book data) is transferred automatically. However, the data transfer setting of the telephone book data by the PBAP process may be specified by the user on the vehicle navigation apparatus 1, in terms of selection between auto-transfer and manual-transfer. That is, for example, only the outbound call history data, the inbound call history data, and the missed call history data are transferred automatically when the user does not set the auto-transfer. Alternatively, when the telephone book data is transferred according to the manual-transfer setting specified by the user, only the telephone book data is stored in the non-volatile storage memory 7, and the stored data may preferably be read from the storage memory 7 to be used as the telephone book data at the subsequent start time of the vehicle navigation apparatus 1.

In addition, the control unit 2 may separately store the outbound call history data, the inbound call history data, and the telephone book data that are received respectively from the different cellular phones 10, in the work memory 6. In this case, the control unit 2 associates the cellular phone 10 with the data in the work memory 6 in the following manner. That is, when the outbound call history data, the inbound call history data, and the telephone book data received from the cellular phone 10 are stored in the work memory 6, a link key is generated based on a cellular phone ID of each of the cellular phones 10 acquired therefrom and an apparatus ID of the vehicle navigation apparatus 1, and the link key is associated with the various data for storage in the work memory 6. Thereafter, the control unit 2 re-generates the link key based on the received cellular phone ID and the apparatus ID when it receives the cellular phone ID from one of the cellular phones 10, and updates the various data in the work memory 6 in association with the re-generated link key.

In addition, the control unit 2 receives the inbound call history data from the cellular phone 10, with distinction in terms of either of the responded call or the missed call. When both of the missed call and the responded call are displayed together in a list form, each of the data entries may preferably be associated with a responded call icon or a missed call icon in the list. The responded call icon may be a combination of a handset figure and an arrow, and the missed call icon may be a combination of a handset figure and an 'X' sign.

In the above, an example of a case where the outbound call history data, the inbound call history data, and the telephone book data transferred from the cellular phone 10 are stored in the work memory 6, or a case where only the telephone book data is stored in the storage memory 7 has been explained. However, the outbound call history data, the inbound call history data, and the telephone book data may be stored in the storage memory 7. If "the storage in the storage memory 7" scheme is adopted, the data (the outbound call history data, the inbound call history data, and the telephone book data) in the storage memory 7 are retained even when a power supply for the navigation apparatus 1 is turned off.

As described above, the data transfer by PBAP is performed only when it is required by connecting HFP and PBAP at the same time in to the present embodiment, thereby preventing unnecessary data transfer and still enabling the latest inbound/outbound/missed call history of the cellular phone updated on the navigation apparatus 1.

Further, when (a) a Bluetooth communication channel is established between the cellular phone 10, and (b) the vehicle navigation apparatus 1 and the outbound call history data and the inbound call history data which has been stored before the cellular phone 10 establishes the Bluetooth communication channel are received from the cellular phone 10, and (c) the received data is stored in the work memory 6 together with the outbound call history data and the inbound call history data of the navigation apparatus 1, for enabling a call placement operation by using the outbound call history data and the inbound call history data afterwards, it is possible to place a call by selecting a desired telephone number from among the auto-transferred outbound call history data and inbound call history data of the cellular phone 10, as well as placing a call by selecting a telephone number from among the outbound/inbound call history data that has been used in the calls placed/received by the navigation apparatus 1 itself. That is, in other words, the user convenience is improved by the above operation scheme.

Furthermore, after having received the outbound call history data and the inbound call history data from the cellular phone 10, by adopting the operation scheme that causes the reception of the telephone book data from the cellular phone 10 only when the user performs a predetermined operation on the operation unit 4, the reception of the outbound call history data and the inbound call history data having higher update frequency is prioritized than the reception of the telephone book data having lower update frequency. The prioritized reception of the outbound/inbound call history data is also beneficial, due to the data format conversion requirement for the telephone book data. That is, in other words, the outbound/inbound call history data can be transferred in a shorter time without data format conversion, in comparison the data transfer of the telephone book data, which takes longer transfer time due to the data format conversion requirement. Further, the in-frequently updated telephone book data having greater data transfer time may selectively received, that is, whether to receive the telephone book data can be selected by the user, thereby improving the user convenience.

Furthermore, when the outbound call history data, the inbound call history data, and the telephone book data are separately stored in the work memory 6 for each of the cellular phones 10, those data can be managed in association with the respective cellular phones 10. In addition, when the outbound call history data, the inbound call history data, and the telephone book data are separately stored in the storage memory 7 in association with each of the cellular phones 10, it is not required to receive the telephone book data from those cellular phones 10 everytime the power supply of the navigation apparatus 1 is turned on, thereby greatly improving the user convenience in terms of quick and smooth use of the telephone book data by the user, due to the already-established association between the telephone book data in the storage memory 7 and his/her own cellular phone 10.

The present invention is not limited to the above-described embodiments, but can be modified or expanded in the following manner. That is, an in-vehicle handsfree apparatus may be composed of as a dedicated device that mainly serve as a handsfree apparatus, or may be composed of as an audio-visual device that plays CDs and radio programs in addition to the handsfree function. Further, the vehicle navigation apparatus 1 may be a portable device that can be carried by the user. Further, instead of using the Bluetooth communication between the cellular phone 10 and the navigation apparatus 1, a different configuration using other short range wireless communication may be adopted. Alternatively, a wired communication may also be adopted.

Furthermore, the number of data entries of the outbound call history data and the inbound call history data stored in the work memory 6 may be one entry. Furthermore, thought the vehicle navigation apparatus 1 is described to display multiple entries of the outbound call history data and multiple entries of the inbound call history data at the same time in the above description, those data may be displayed item by item. In this case, for example, the latest data is displayed first, and the next latest data may subsequently be displayed by the operation of the operation unit 4. Furthermore, when the Bluetooth communication channel is established between the vehicle navigation apparatus 1 and the cellular phone 10, the outbound call history data and the inbound call history data together with the telephone book data may be transferred only when the vehicle navigation apparatus 1 or the cellular phone 10 is operated, instead of transferring the outbound call history data and the inbound call history data automatically.

Such modifications and expansions are, as claimed in the appended claims, within the scope of the present invention.

The invention claimed is:

1. A handsfree apparatus for use in a vehicle comprising:
 a handsfree call protocol connection unit connecting a handsfree telephone call protocol that establishes a handsfree telephone call with a cellular telephone;
 a data transfer protocol connection unit connecting, with the cellular telephone, a data transfer protocol that performs data transfer processing enabling reception of, from the cellular telephone, at least one of outbound call history data, inbound call history data, missed call history data and telephone book data stored in the cellular telephone; and a control unit enabling automatic reception of the outbound call history data immediately after termination of an outbound call that has been placed from the cellular telephone by using the data transfer protocol connected by the data transfer protocol connection unit, if the outbound call from the cellular telephone is determined to have been placed by an operation on the cellular telephone while the handsfree call protocol connection unit is in a protocol connected condition of the handsfree telephone call protocol.

2. A handsfree apparatus according to claim 1, wherein the control unit, without an input from a user, automatically enables reception of the outbound call history data of the outbound call that has been placed from the cellular telephone by using the data transfer protocol connected by the data transfer protocol connection unit after the outbound call from the cellular telephone is determined to have been placed by an operation on the cellular telephone while the handsfree call protocol connection unit is in the protocol connected condition of the handsfree telephone call protocol.

3. The handsfree apparatus according to claim 1, wherein the control unit starts from the beginning, the reception of the outbound call history data from the cellular telephone by using the data transfer protocol after the outbound call from the cellular telephone which was determined to have been placed by the operation on the cellular telephone while the handsfree call protocol connection unit is in the protocol connected condition has been completed.

4. A handsfree apparatus for use in a vehicle comprising:
a handsfree call protocol connection unit connecting a handsfree telephone call protocol that establishes a handsfree telephone call with a cellular telephone;
a data transfer protocol connection unit connecting, with the cellular telephone, a data transfer protocol that performs data transfer processing enabling reception of, from the cellular telephone, at least one of outbound call history data, inbound call history data, missed call history data and telephone book data stored in the cellular telephone; and
a control unit enabling automatic reception of the outbound call history data immediately after termination of an outbound call that has been placed from the cellular telephone by using the data transfer protocol connected by the data transfer protocol connection unit, if the outbound call is determined to have been placed from the handsfree apparatus while the handsfree call protocol connection unit is in a protocol connected condition of the handsfree telephone call protocol.

5. The handsfree apparatus according to claim 4, wherein the control unit, without an input from a user, automatically enables reception of the outbound call history data of the outbound call that has been placed from the cellular telephone by using the data transfer protocol connected by the data transfer protocol connection unit after the outbound call is determined to have been placed form the handsfree apparatus while the handsfree call connection unit is in a protocol connected condition of the handsfree telephone call protocol.

6. The handsfree apparatus according to claim 4, wherein the control unit starts from the beginning, the reception of the outbound call history data from the cellular telephone by using the data transfer protocol after the outbound call from the cellular telephone which was determined to have been placed from the handsfree apparatus while the handsfree call protocol connection unit is in the protocol connected condition has been completed.

7. A handsfree apparatus for use in a vehicle comprising:
a handsfree call protocol connection unit connecting a handsfree telephone call protocol that establishes a handsfree telephone call with a cellular telephone;
a data transfer protocol connection unit connecting, with the cellular telephone, a data transfer protocol that performs data transfer processing enabling reception of, from the cellular telephone, at least one of outbound call history data, inbound call history data, missed call history data and telephone book data stored in the cellular telephone; and
a control unit enabling automatic reception of at least one of inbound call history data and missed call history data from the cellular telephone by using the data transfer protocol connected by the data transfer protocol connection unit, to acquire the at least one of the inbound call history data and the missed call history data immediately after the termination of an inbound call, if the handsfree call protocol connection unit has the inbound call in a protocol connected condition of the handsfree telephone call protocol.

8. The handsfree apparatus according to claim 7, wherein the control unit, without an input from a user, automatically enables the reception of at least one inbound call history data and missed call history data from the cellular telephone by using the data transfer protocol connected by the data transfer protocol connection unit after a detection of state transition of the handsfree call protocol connection unit from a first state of communication to a second state of communication, the first state is in a protocol connected condition and having an inbound call, and the second state that is different from having the inbound call due to an end of having the inbound call.

9. The handsfree apparatus according to claim 7, wherein the control unit starts from the beginning, the reception of at least one of the inbound call history data and the missed call data from the cellular telephone by using the data transfer protocol after the inbound call to the cellular telephone while the handsfree call protocol connection unit is in the protocol connected condition has been completed.

10. A handsfree apparatus for use in a vehicle comprising:
a data transfer protocol connection unit connecting, with the cellular telephone, a data transfer protocol that performs data transfer processing enabling reception of, from the cellular telephone, at least one of outbound call history data, inbound call history data, missed call history data and telephone book data stored in the cellular telephone; and
a control unit enabling automatic reception of at least one of outbound call history data, inbound call history data, missed call history data and telephone book data from the cellular telephone through performance of periodic data transfer at specified time periods by using the data transfer protocol connected by the data transfer protocol connection unit.

11. The handsfree apparatus according to claim 10, wherein the control unit automatically starts from the beginning, the reception of at least one of the outbound call history data, the inbound call history data, the missed call history data and the telephone book data from the cellular telephone through the performance of periodic data transfer by using the data transfer protocol while the handsfree call protocol unit is in a continuous protocol connected condition with the cellular telephone.

* * * * *